(12) United States Patent
Bui (10) Patent No.: US 7,788,034 B2
(45) Date of Patent: Aug. 31, 2010

(54) METHOD FOR DETERMINING A FLIGHT MANAGEMENT SYSTEM RENDEZVOUS INTERCEPT POSITION

(75) Inventor: Tien D. Bui, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 1232 days.

(21) Appl. No.: 11/158,885

(22) Filed: Jun. 22, 2005

(65) Prior Publication Data

US 2006/0287781 A1 Dec. 21, 2006

Related U.S. Application Data

(60) Provisional application No. 60/584,024, filed on Jun. 30, 2004.

(51) Int. Cl.
| | |
|---|---|
| G05D 1/02 | (2006.01) |
| G06F 17/10 | (2006.01) |
| G06G 7/78 | (2006.01) |
| G08G 1/16 | (2006.01) |
| F41G 9/00 | (2006.01) |

(52) U.S. Cl. .................. 701/302; 701/1; 701/3; 701/4; 701/5; 701/8; 701/9; 701/14; 701/17; 701/300; 701/301

(58) Field of Classification Search .................. None
See application file for complete search history.

(56) References Cited

U.S. PATENT DOCUMENTS

| | | | |
|---|---|---|---|
| 3,964,695 A | 6/1976 | Harris | |
| 6,271,768 B1 | 8/2001 | Frazier, Jr. et al. | |
| 6,459,411 B2 | 10/2002 | Frazier, Jr. et al. | |
| 6,646,588 B2 | 11/2003 | Tran | |

(Continued)

FOREIGN PATENT DOCUMENTS

GB    856738    12/1960

(Continued)

OTHER PUBLICATIONS

Sodano et al., Direct and inverse solutions of geodesics, Jul. 1963, Army Map service, Tecnical report No. 7.*

(Continued)

Primary Examiner—Khoi Tran
Assistant Examiner—Bhavesh V Amin
(74) Attorney, Agent, or Firm—Shumaker & Sieffert, P.A.

(57) ABSTRACT

One popular military aircraft mission is to meet or rendezvous with another aircraft. Presently used systems have limitations in rendezvous distance, low accuracy of computed rendezvous intercept position, and wrong results in special rendezvous scenarios such in polar regions or on a collision path. The present invention makes use of a numerical algorithm to accurately compute the rendezvous interception position with a preselected tolerance/resolution. The algorithm makes no assumption of angles and uses a proven Sodanos equation to compute a distance between two points on the earth or to compute a second position away from a first position at a known distance and bearing. Using the invention, the rendezvous intercept position can be computed with greater accuracy and a further distance in any region of the globe than the prior art methods and can be used even if the aircraft are in a rendezvous or collision/chasing path.

19 Claims, 5 Drawing Sheets

U.S. PATENT DOCUMENTS 6,744,396 B2 * 6/2004 Stone et al. .................. 342/36

FOREIGN PATENT DOCUMENTS

JP          01 079596        3/1989

OTHER PUBLICATIONS

US DOT—FAA, Introduction to TCAS II Version 7, Nov. 2000, US DEPArtment of Transportation—FAA.*

Sodano, E.M., General Non-Iterative Solution of the Inverse and Direct Geodetic Problems; The Journal of The International Association of Geodesy; Mar. 1, 1965; pp. 69-89; Bureau Central De L'Association International De Geodesie, 19, rue Auber—Paris, France.

Sodano, E.M., Supplement to Inverse Solution of Long Geodesics; The Journal of The International Association of Geodesy; Sep. 1, 1967; pp. 233-237; Bureau Central De L'Association Internationl De Geodesie, 19, rue Auber—Paris, France.

International Search Report for PCT/US2005/023176 dated Apr. 6, 2009.

* cited by examiner

METHOD FOR DETERMINING A FLIGHT MANAGEMENT SYSTEM RENDEZVOUS INTERCEPT POSITION

CROSS-REFERENCE TO RELATED APPLICATIONS

This application is based on U.S. Provisional Application Ser. No. 60/584,024 entitled "Method and Apparatus for Determining FMS Rendezvous Intercept, filed on Jun. 30, 2004, the teachings of which are incorporated herein by reference.

BACKGROUND OF THE INVENTION

1. Field of the Invention (Technical Field)

The present invention relates to Flight Management Systems (FMS) and more particularly to a method for calculating an intercept position where one aircraft will intersect with a target aircraft.

2. Background Art

The most common rendezvous (RZ) intercept computation is to use the spherical triangle formula. With the assumption of small angles, the non-linear spherical formula can be converted to a quadratic formula that can be solved easily. There are three major problems with the prior art approach. This small angle approximation limits the rendezvous distance to less than 600 nautical miles (NM). Secondly, the wrong solution is computed when two aircraft are flying on the same path where the triangle becomes a straight line and the spherical triangle formula is no longer valid. Third, no adjustment is made when the intercept position is in a polar region where the earth is not a perfect sphere. These are the problems the present invention solves.

These problems occur in C130J-Communication Navigation Identification (C130J-CNI), C27J-Communication Navigation Identification (C27J-CNI), C141-GPS Enhanced Navigation System (C141-GENE), and Core Flight Management System (Core FMS). They use the same method, the spherical triangle formula, to compute the rendezvous intercept position. For example, the method used in C130J-CNI FMS to compute the rendezvous intercept position can be re-derived as follows:

$$\cos a = \cos b \cdot \cos c + \sin b \cdot \sin c \cdot \cos A \quad (1)$$

where $a = v_1 \cdot t/R$ $c = v_2 \cdot t/R$ $b = d/R$ d: a great circle distance between two initial aircraft positions R: average radius of Earth A: angle between b and c Assuming a and c are small, plug a, b, c into (1), and use second order approximation for sin and cos functions, we get the following equation:

$$A_0 \cdot t^2 + B_0 \cdot t + C = 0 \quad (2)$$

where $$A_0 = v_1^2 - v_2^2 \cdot \cos b$$

$$B_0 = 2 \cdot v_2 \cdot \sin b \cdot \cos A$$

$$C_0 = 2 \cdot \cos b - 2$$

If $B_0^2 - 4 \cdot A_0 \cdot C_0 \geq 0$, the smaller non-zero positive solution of equation (2) is the intercept position.

The C130J-CNI Rendezvous calculation is based on two assumptions:

a) The current aircraft, target aircraft, and interception positions form a spherical triangle, not a straight line; and b) The sides of the triangle need to be less than 600 NM (due to the small angle approximation).

Therefore, the prior art systems will fail when the two aircraft are flying on the same track regardless what direction the aircraft fly. In this case the law of cosine does not work. The assumption of small angles a and c (from the equations above) limits the rendezvous distance to 600 NM (equivalent to 10 degrees). The law of cosine works in a perfect sphere but not in the polar regions of the earth.

The present invention is not based on these assumptions, so it provides a solution for any scenario (longer than 600 NM and/or when the two aircraft are flying on the same track). The present invention uses a Sodanos equation (*The Journal of the International Association of Geodesy* in March 1965, and a supplement was published in the same publication in September of 1967) to compute the great circle distance d between two initial aircraft positions. The present invention consistently provides a rendezvous intercept position with the same selectable accuracy even when the rendezvous distance is longer 600 NM, the intercept position is in a polar region, or the two aircraft flying on the same path.

U.S. Pat. No. 6,271,768 B1, discloses the method to display the formation of aircraft within a distributed collision avoidance and control among multiple aircraft within formation which use a passive Traffic Alert and Avoidance System (TCAS) and Mode-S data link transponder. The display denotes the relative altitude as well as relative velocity of the formation follower aircraft with respect to the lead formation aircraft. This system is directly related to the patent mentioned below which describes the method of determining the aircraft placement within the formation.

U.S. Pat. No. 6,459,411 B2, discloses a method to offer distributed collision avoidance and control amid multiple aircraft within formation for use with a passive Traffic Alert and Avoidance System (TCAS) and Mode-S data link transponder. This system allows for close formation flights among multiple aircraft without needless traffic advisories. These close formation flights are made possible through the use of a Mode-S transponder which is used to process data such as aircraft position and pass data such as steering commands between aircraft. Where as this system deals with maintaining separation of aircraft within a formation, the current invention deals with the computation of an intercept location of two aircraft and thus is extremely different.

U.S. Pat. No. 6,646,588 B2, discloses a solution for implementing a midair collision avoidance system (MCAS). This system is comprised of a tactical module, which is used in conjunction with air traffic management to offer quick-time response, diminished jamming and interference, and minimized detection beyond 10 miles or so. The tactical module can be used to provide display and control guidance to support rendezvous. This system is therefore, used to aid in a rendezvous, but is not directly needed to determine the rendezvous position. Thus, this system has no relevance to the solution proposed in the current invention.

SUMMARY OF THE INVENTION (DISCLOSURE OF THE INVENTION)

One of the most popular military aircraft missions is to meet or rendezvous with another aircraft (target aircraft). This invention computes a rendezvous (RZ) intercept position at a preselected tolerance/accuracy for an aircraft with known initial position, time, and ground speed, to meet with a target aircraft with known initial position, time, ground speed, and heading track.

The rendezvous function computes an intercept position on a path projected for a rendezvous aircraft (i.e., the target). The intercept position is computed using crew entered target data and current or planned aircraft position, ground speed, and time. Target data specifies the target's ground speed, course, initial position, time the target will be at the initial position, and an offset distance to place the intercept position behind the target.

A twelve (12) hour time difference limitation is used because there is no date associated with the initial time. This covers the cases where the target's initial time is on a different day from the time of the starting point on the intercept solution.

The first step is to adjust the position of the target aircraft based on the time difference between the aircraft and the target aircraft. This adjustment will move the position of the target aircraft either forward or backwards along the track of the target aircraft.

The distance from the aircraft to the adjusted target position as well as the bearing from the target to the aircraft is computed as well as the bearing from the target to the initial intercept position.

The rendezvous intercept is computed by a numerical method as follows: with a target time to fly, find the new target position on the target track and the initial point of the rendezvous, and then find the aircraft time to fly needed for the aircraft to fly to the initial point. If the aircraft time to fly is greater than the target time to fly, increase the target time to fly and re-compute the aircraft time to fly. Repeat this process until the difference of the target time to fly and the aircraft time to fly is less than the time tolerance for the convergence case. The loop has several exit criteria that prevents an infinite loop from occurring.

There is also an algorithm used to increase target time to fly fast and back off when the target time to fly is greater than the aircraft time to fly in order to reduce the number of iterations.

The primary object of the present invention is to provide an accurate rendezvous intercept position even with a long rendezvous distance (up to 3600 NM).

Another object of the present invention is to provide an accurate rendezvous intercept position, even if the rendezvous position is in polar regions, using proven Sodanos equations.

Another object of the present invention is to provide an accurate rendezvous intercept position even when both rendezvous aircraft are flying on a collision path or chasing each other.

The first advantage of the present invention is that the invention does not use a small angle approximation, thus extending the rendezvous distance far beyond 600 NM.

Another advantage of the present invention is that the accuracy of the rendezvous intercept usually can be predetermined based on its application, and the numerical solution of the invention can be used without modification to achieve the predetermined rendezvous resolution (accuracy). The only difference is that it requires more or less iterations for more or less accurate solution.

Another advantage of the present invention is that it performs the convergence check in the first two iterations, thus stopping the computation in the early stage of non-convergence cases. In addition, the invention has an algorithm to quickly reach the actual rendezvous intercept position (within predetermined resolution/tolerance) with many fewer number of iterations than if no such an algorithm is used, thus saving a great deal of computing time.

Other objectives, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objectives and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED
EMBODIMENTS (BEST MODES FOR
CARRYING OUT THE INVENTION)

The flight management systems (FMS) rendezvous functionality calculates an intercept position where one aircraft will meet up with the target aircraft. The previous FMS rendezvous calculation comes up with a correct intercept solution only when the current aircraft, target aircraft, and the intercept position form a oblique spherical triangle (not a straight line) whose sides are not longer than six hundred (600) NM (based on trigonometry approximation of small angle less than or equal to 10°). The present invention for computing RZ uses a new approach, a numerical solution. The computation starts by picking an assumed intercept position, and times needed for the two aircraft to fly to that point are then computed. If the two times are different, the intercept position gets moved along the target track to the next new position until the time difference is within a pre-determined time tolerance.

The key of the new solution is to assume an intercept position is given at a point on the target track instead of computing the intercept position directly. With the assumed intercept position (point P), compute times t1 and t2 needed for target aircraft (AC) and current AC to fly respectively from their initial position to the point P. If |t2−t1|>To (To: time tolerance, let's say, ~3 sec), move point P along the target track in the appropriate direction to have a smaller delta_t=t2−t1, then recompute t1, t2, delta_t until |delta_t|<=To. In order to reduce the calculation time (number of iterations), the delta_t values of the first two iterations can be used to perform the solution convergence check. If delta_t_2>delta_t_1, it's divergent (no solution); otherwise, it is convergent. If it is convergent, keep moving the point P outward until |delta_t|<To. In order to reach the actual intercept position (AIP) faster, the time interval will be doubled (tripled, or quadrupled) until AIP is reached or passed. If it is passed, the last saved time interval will be used as the starting point and be divided by half in next iterations until AIP is reached. The number of iterations for typical cases is 8.

The rendezvous solution can be applied where one moving object (air/ground vehicles or ships) is required to meet up with another object moving in a fixed direction. The best mode of operation is two aircraft rendezvousing, but it equally applies to naval operation. The solution will work the best if the following enhancements are used to reduce the calculation time: a) the convergence check; b) the first target time used is the time needed for the two objects meet together assuming they're moving on the collision path defined by their initial positions; and c) time interval (its initial value is To) will be doubled (tripled or quadrupled) until the AIP is passed, and then be divided by 2 if it's greater than To.

Before discussing the invention in detail, it is prudent to repeat the rendezvous problem here. In a typical rendezvous problem, one aircraft with a known ground speed and initial position tries to rendezvous/intercept with a target aircraft whose initial position and flight track are known. In other words, the intercept position must be on the target aircraft's flight path, so one can pick a point close to the target initial point and assume that point be an intercept point. Times are then computed for the two aircraft to fly from their initial point at their own ground speed to the assumed intercept point. If the flight times of both aircraft are different, the assumed intercept point is moved to a new location along the target aircraft's flight path until the flight time difference is within a pre-selected time tolerance.

$t1_i$: time needed for the current AC to fly to point $P_i$
$t2_i$: time needed for the target AC to fly to point $P_i$ Stop Condition:
$|\Delta t_i| = |t1_i - t2_i| \leq$ To (time tolerance)

To is pre − determined as follows:
$$T_o = \frac{\text{Visual Distance}}{\text{Typical Ground Speed}}$$

target AC  P1  Pi  Pn $t2i$ is determined as follows
$t2_i = t2_{i-1} + dt_i \quad i = 2 \ldots n$ $t2_1 = \dfrac{d}{V_1 + V_2} \quad dt_2 = T_o$ $dt_i = \begin{cases} 4 \cdot dt_{i-1} \\ 0.5 \cdot dt_{i-1} \text{ if } dt_{i-1} \geq 2 \cdot T_o \end{cases}$ when the actual intercept point has not passed yet after the actual intercept point has passed Compute $P_i$ using the direct Sodanos equation with $t2_i$, $V_2$, target heading.
Compute $t1_i$ using the inverse Sodanos equation with the current aircraft's initial position, $V_1$ and $P_i$.
Compute $\Delta t_i$. Repeat steps above until the stop condition is satisfied.

The invention also has logic to detect divergence cases early and thus stop the computation. The coefficients in the $dt_i$ formula found by experiments lead the least number of iterations in the worst case scenario. One can use different coefficients for their nominal scenarios, but the algorithm should not be changed.

The present invention provides an accurate rendezvous intercept position. This type of rendezvous is usually used together with a refueling pattern.

Figure 1:
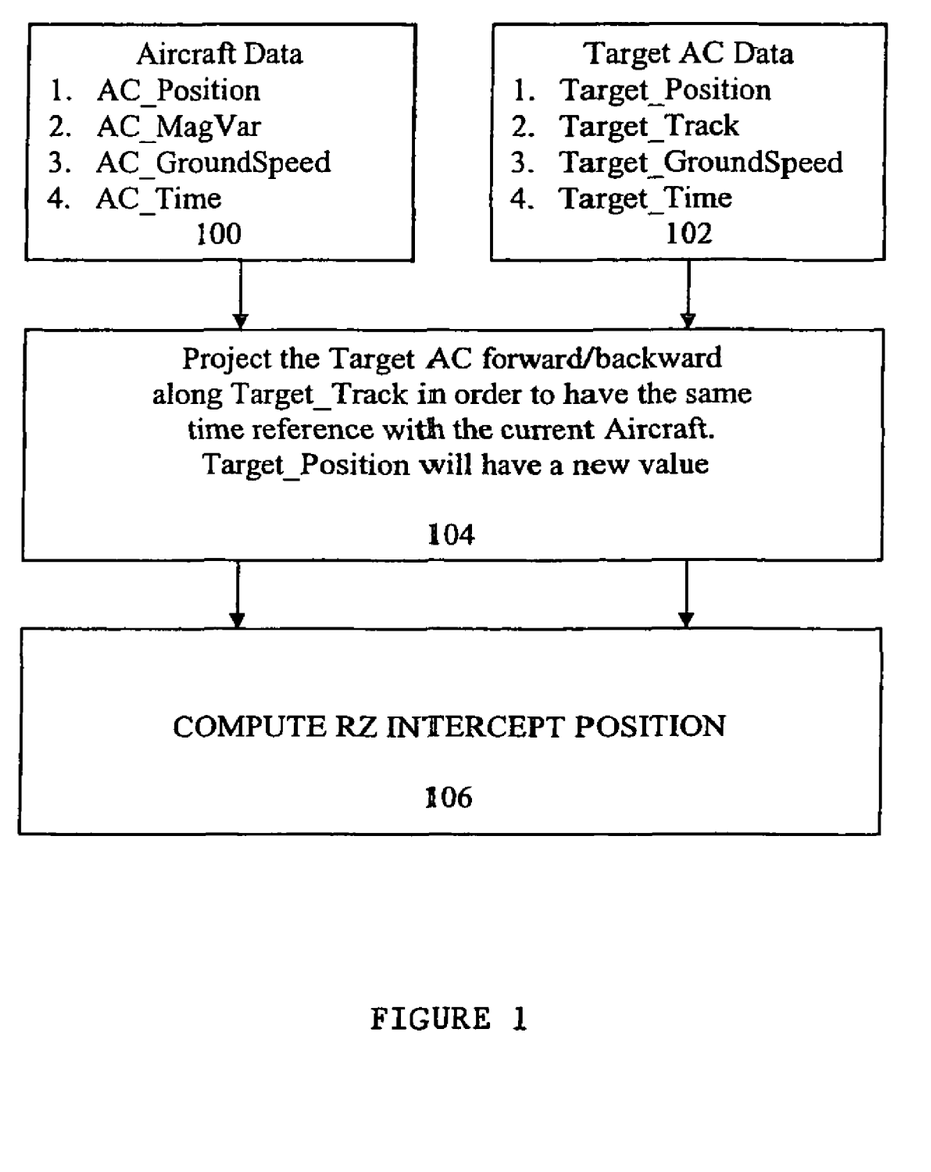
FIG. 1 is a high level flow chart showing the preferred method of the present invention.

FIG. 1 is a high level flow chart showing the preferred method. The inputs needed from the aircraft (AC) and the target aircraft are shown in aircraft data 100 and target aircraft data 102. The target aircraft and the AC are projected to rendezvous. As shown, position, track, groundspeed and time are needed as well as the aircraft's position, groundspeed, time, and magnetic variation (MagVar).

First, the target's position must be adjusted so that the target will be in the same time reference as the AC 104. After this is accomplished, the rendezvous position processing can begin 106.

Figure 2:
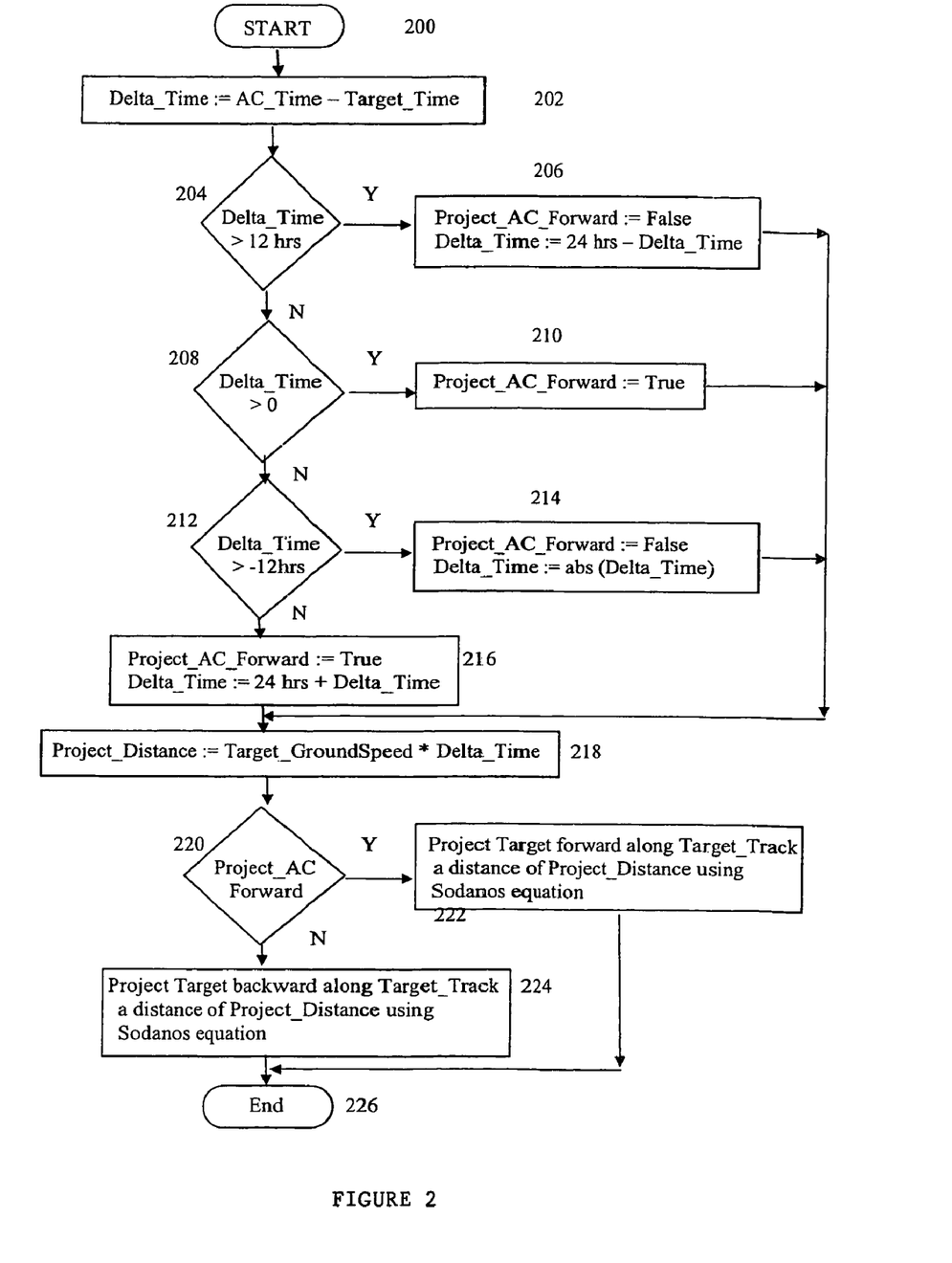
FIG. 2 is a flowchart showing the detailed descriptions for blocks 104 and 106 of FIG. 1.

FIG. 2 is a flowchart showing the detailed descriptions for blocks 104 and 106 of FIG. 1. The process starts 200 with the time difference (delta time) between the aircraft and the target being computed 202. Blocks 204 through 216 determine if the target is to be projected forward or backwards along its track in order to get a common time reference with the AC. Since no date is normally associated with the time, these blocks also adjust the delta time accordingly. Twelve (12) hours was an arbitrary time difference that usually means that the aircraft time and the target time are in different days.

Check if the delta time is greater than twelve (12) hours 204. If yes, adjust the delta time and set the projection direction flag to false to indicate that the target is to be projected backwards along the track 206 and the go to the distance that the target needs to be moved 218. If no, check if the delta time is greater than zero (0) 208. If yes, the target must be projected forward along its track so set the projection direction flag to true 210 and then proceed to the distance that the target needs to be moved 218. If no, check if the delta time is greater than minus twelve (−12) hours 212. If yes, the target must be projected backwards so set the projection direction flag to false and change the delta time to a positive value 214 and then proceed to the distance that the target needs to be moved 218. If no, the target must be projected forward so set the projection direction flag to true and then adjust the delta time accordingly 216.

Next, compute the projection distance by multiplying the adjusted delta time by the target's groundspeed. This is the distance that the target needs to be moved 218.

The next step is to check the projection direction flag 220. If true, project the target forward along the target's track by the projection distance using a Sodano equation 222. If false, project the target backwards along the target's track by the projection distance using a Sodano equation 224. The process then ends 226.

Figure 3A:
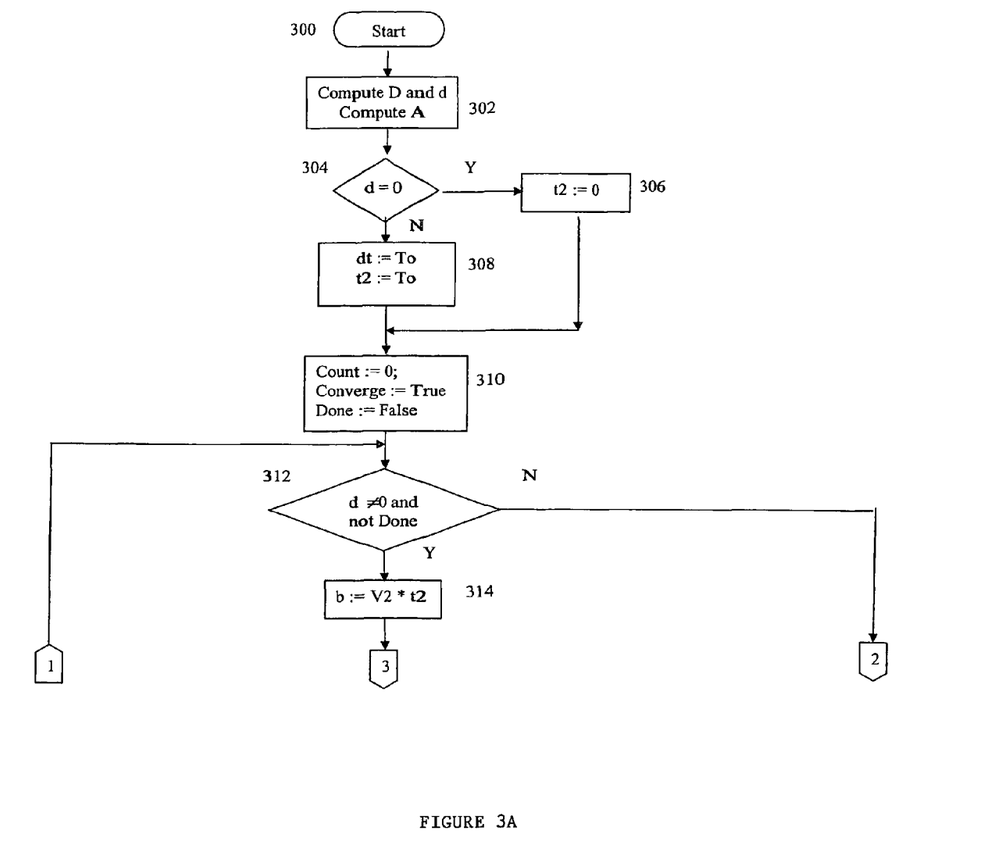
FIGS. 3a, 3b and 3c are a continuing flow chart showing a detailed description of block 106 of FIG. 1.
Figure 3B:
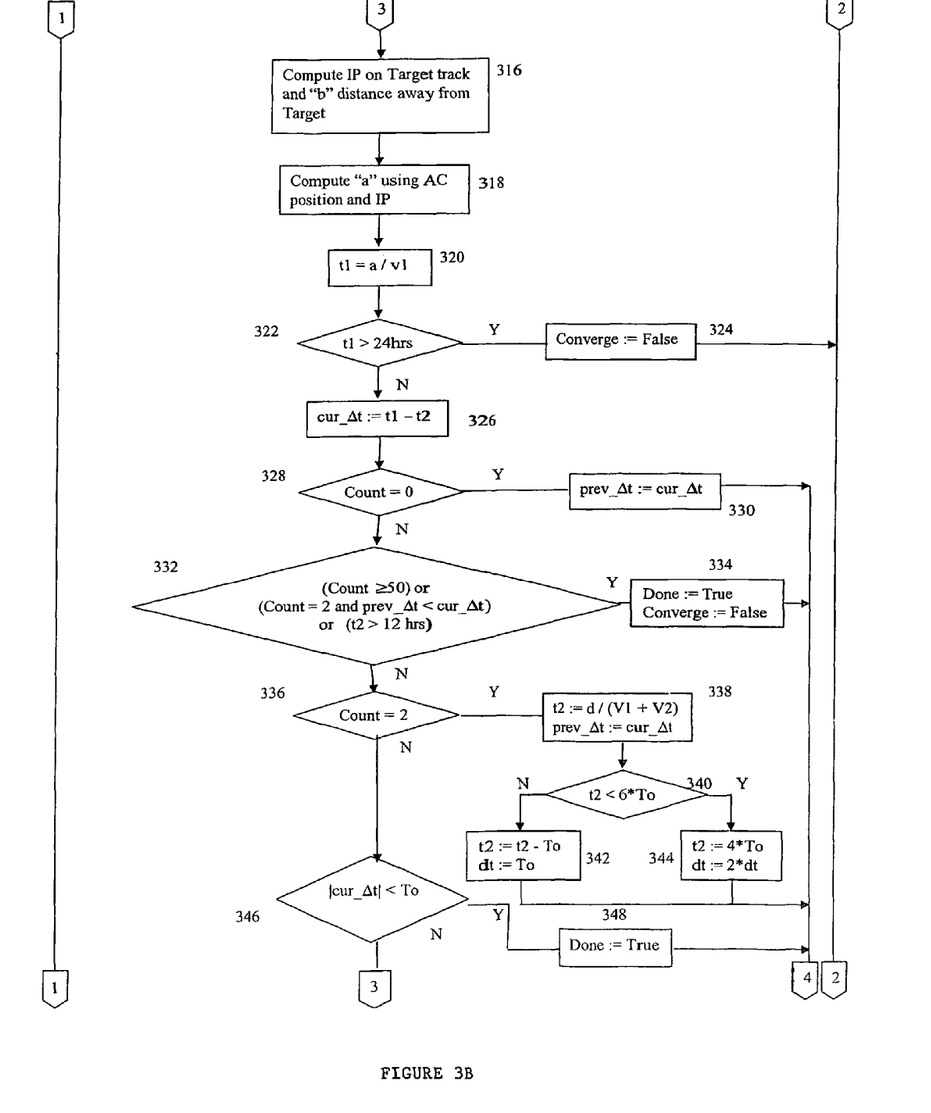
Figure 3C:
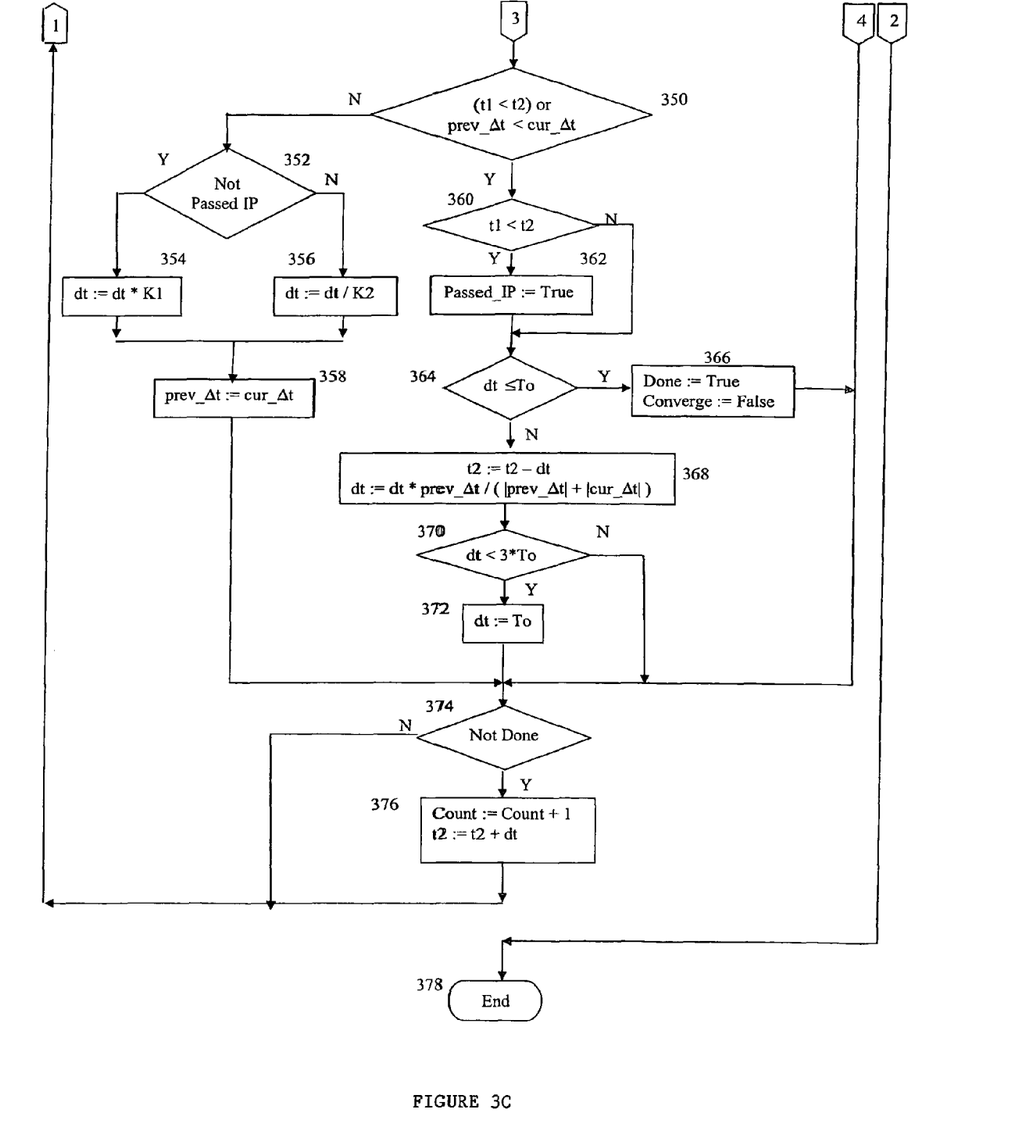

FIGS. 3*a*, 3*b* and 3*c* are a continuing flow chart showing a detailed description of block 106 of FIG. 1. In this flow chart the following definitions of the terms are as follows:

| Known: | Computed: |
|---|---|
| AC and Target positions | t1: AC time to fly |
| T: Target track | t2: Target time to fly |
| R: Earth radius | prev_Δt: previous time difference |
| V1: AC ground speed | cur_Δt: current time difference |
| V2: Target ground speed | T: bearing (from North) of target track |
| To: time tolerance | a: distance between the AC and the IP |
| K1: 2 to 4 | b: distance between the Target and the IP |
| K2 ≈ 0.5 | d: distance between the Target and the AC |
| | D: bearing (from North) from the Target to the AC |
| | A: bearing difference between D and T |
| | dt: Time Interval |

The computation of the rendezvous position starts 300 by computing the bearing from the target to the AC as well as the distance between the two 302. Check if the distance between the target and the AC is close to zero 304. If the distance between the two is close to zero, set the target time to fly to zero 306. If the distance is not close to zero, set the time interval and the target time to fly to the time tolerance value 308. The time tolerance value is the visible distance divided by the typical groundspeed of the aircraft. Then, initialize the loop counter and the done and converge flags 310. Check if the distance between the AC and the target is not zero and that the done flag is not set to true 312. If either condition is false, proceed to end 378. Otherwise the processing continues.

Next, compute the distance to the initial point (IP) by multiplying the target groundspeed by the target time to fly 314. Compute the position of the IP using the distance and the target track as inputs to a Sodanos equation 316. Compute the distance between the AC and the IP using the position of the AC and the IP 318. Compute the AC time to fly by dividing the distance from the AC to the IP by the AC's groundspeed 320. If the AC time to fly is greater that twenty-four (24) hours 322 then set the convergence flag to false 324 and proceed to end 378. This means that the algorithm will not converge on a solution.

Otherwise, compute the current time difference between the AC time to fly and the target time to fly 326. If this is the first pass through the loop, count equals zero (0), set the previous time difference to the current time difference 330 and proceed to not done 374. Otherwise, do checks to prevent an infinite loop from occurring 332. If the algorithm has gone through the loop fifty (50) or more times or the target time to fly has exceeded twelve (12) hours or if the this is the third (3) pass through the loop and the previous time difference is less than the current time difference, then the done flag is set to true and the converge flag is set to false 334 and then proceed to not done 374. Otherwise, check the loop counter to see if this is the third pass though the loop, count equals two (2) 336. If it is, the target time to fly is computed as the distance between the aircraft divided by the sum of the aircraft's groundspeeds and the previous time difference is set to the current time difference 338. Check if the target time to fly is less than six (6) times the time tolerance value 340. If yes, the target time to fly is set to four (4) times the time tolerance value and the time interval is set to two (2) times the current value of the time interval 344. If no, update the target time to fly by subtracting the time tolerance value from it and setting the time interval to the time tolerance value 342. Then proceed to not done 374.

If this is not the third (3) pass through the loop, check if the absolute value of the current time difference is less than the time tolerance value 346. If yes, the done flag is set to true 348 and proceed to not done 374. If no, continue as described. Check if the AC time to fly is less than the target time to fly or if the previous time difference is less than the current time difference 350. If both are false, check if the IP position has not been passed 352. If yes, adjust the time interval by K1 354 otherwise adjust the time interval by dividing by K2 356. Set the previous time difference to the current time difference 358 and proceed to not done 374. If either of the tests in block 350 above is true; check if the AC time to fly is less than the target time to fly 360. If yes, set the passed IP flag to true 362. Otherwise do nothing. Check if the time interval is less than or equal to the time tolerance value 364. If yes, set the done flag to true and the converge flag to false 366 and proceed to not done 374.

Otherwise, the time interval is subtracted from the target time to fly and then the time interval is modified by multiplying the old value by the previous time difference divided by the sum of the absolute value of the previous time difference and the current time difference 368. Check if the time interval is less than three (3) times the time tolerance value 370. If yes, set it to the time tolerance value 372, otherwise, do nothing. Test if the done flag is not set 374. If true, the count is incremented by one and target time to fly is modified by adding time interval to it 376. Otherwise this block is skipped. The algorithm has completed a pass through the loop and returns to block 312 for the next pass through. End 378 is the exit block and also the exit point of the process. This is the point where the output checking can be performed and the rendezvous position can be determined.

The preceding discussion refers to aircraft, however the same methodology can be used for any type of vehicles, including ground based vehicles, water borne vehicles or a combination of the three. This description is meant to cover these types of vehicles also.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A method for determining a rendezvous intercept position of a first vehicle and a target vehicle, the method comprising:
   a) designating an arbitrary point along a projected travel path of the target vehicle as a first intercept position;
   b) computing a time to travel by the first vehicle to the first intercept position;
   c) comparing the time to travel by the first vehicle to the first intercept position to a time to travel by the target vehicle to the first intercept position;
   d) determining that the time to travel by the first vehicle differs from the time to travel by the target vehicle by more than a threshold amount;
   e) designating a different intercept position along the projected travel path of the target vehicle re-computing the time to travel by the first vehicle to the different intercept position, and re-comparing the time to travel by the first vehicle to a time to travel by the target vehicle to the different intercept position; and
   f) iteratively repeating step e) until a difference of the time to travel by the target vehicle and the time to travel by the first vehicle is less than the threshold amount.

2. The method of claim 1, further comprising performing a non-convergence check between the first vehicle and the target vehicle within a first two iterations of step f).

3. The method of claim 1, wherein designating an intercept position and computing a travel time comprise using a Sodanos equation.

4. The method of claim 1, wherein the threshold amount comprises a predefined convergence window.

5. The method of claim 1, further comprising the step of, prior to designating an arbitrary point, adjusting a position of the target vehicle based on a time difference between the first vehicle and the target vehicle;
   wherein adjusting comprises matching a time frame of the target vehicle to the first vehicle.

6. The method of claim 5, wherein matching a time frame comprises adjusting a current position of the target vehicle to a projected future position of the target vehicle.

7. The method of claim 5, wherein the step of matching a time frame comprises adjusting a current position of the target vehicle to a projected past position of the target vehicle.

8. The method of claim 1, wherein designating a different intercept position comprises moving the first intercept position in a direction away from the target vehicle along the projected travel path of the target vehicle.

9. The method of claim 1, wherein designating a different intercept position comprises moving the first intercept position in a direction towards the target vehicle along the projected travel path of the target vehicle.

10. A method for determining a flight management system rendezvous intercept position of a first aircraft and a target aircraft, the method comprising:
- a) designating an arbitrary point along a projected flight path of the target aircraft as a first intercept position;
- b) computing a time to fly by the first aircraft to the first intercept position with a Sodanos equation;
- c) comparing the time to fly by the first aircraft to the first intercept position to a time to fly by the target aircraft to the first intercept position;
- d) determining that the time to fly by the first aircraft is different than the time to fly by the target aircraft by more than a threshold amount;
- e) designating a different intercept position along the projected flight path of the target aircraft, re-computing the time to fly by the first aircraft with the Sodanos equation, and re-comparing the time to fly by the first aircraft to a time to fly by the target aircraft to the different intercept position; and
- f) iteratively repeating step c) until a difference of the time to fly by the target aircraft and the time to fly by the first aircraft is less than the threshold amount.

11. The method of claim 10, further comprising performing a non-convergence check between the first aircraft and the target aircraft within a first two iterations of step f).

12. The method of claim 10, wherein the threshold amount comprises a predefined convergence window.

13. The method of claim 10, further comprising, prior to designating an arbitrary point, adjusting a position of the target aircraft based on a time difference between the first aircraft and the target aircraft; wherein adjusting comprises matching a time frame of the target aircraft to the first aircraft.

14. The method of claim 10, wherein designating a different intercept position comprises moving the first intercept position in a direction away from the target aircraft along the projected travel path of the target aircraft.

15. The method of claim 10, wherein designating a different intercept position comprises moving the first intercept position in a direction towards the target aircraft along the projected travel path of the target aircraft.

16. The method of claim 10, further comprising determining the arbitrary point designated as the first intercept position by calculating a collision time for the first aircraft and the target aircraft to meet on a direct collision course; and
projecting where the target aircraft will be after a period of time substantially equal to the calculated collision time given its current position, ground speed, and heading.

17. The method of claim 10, further comprising determining the arbitrary point designated as the first intercept position by projecting where the target aircraft will be given its current position, ground speed, and heading after a static predetermined period of time.

18. The method of claim 1, further comprising determining the arbitrary point designated as the first intercept position by calculating a collision time for the first vehicle and the target vehicle to meet on a direct collision course; and
projecting where the target vehicle will be after a period of time substantially equal to the calculated collision time given the target vehicle's current position, ground speed, and heading.

19. The method of claim 1, wherein the arbitrary point designated as the first intercept position is determined by projecting where the target vehicle will be given its current position, ground speed, and heading after a static predetermined period of time.

* * * * *